UNITED STATES PATENT OFFICE.

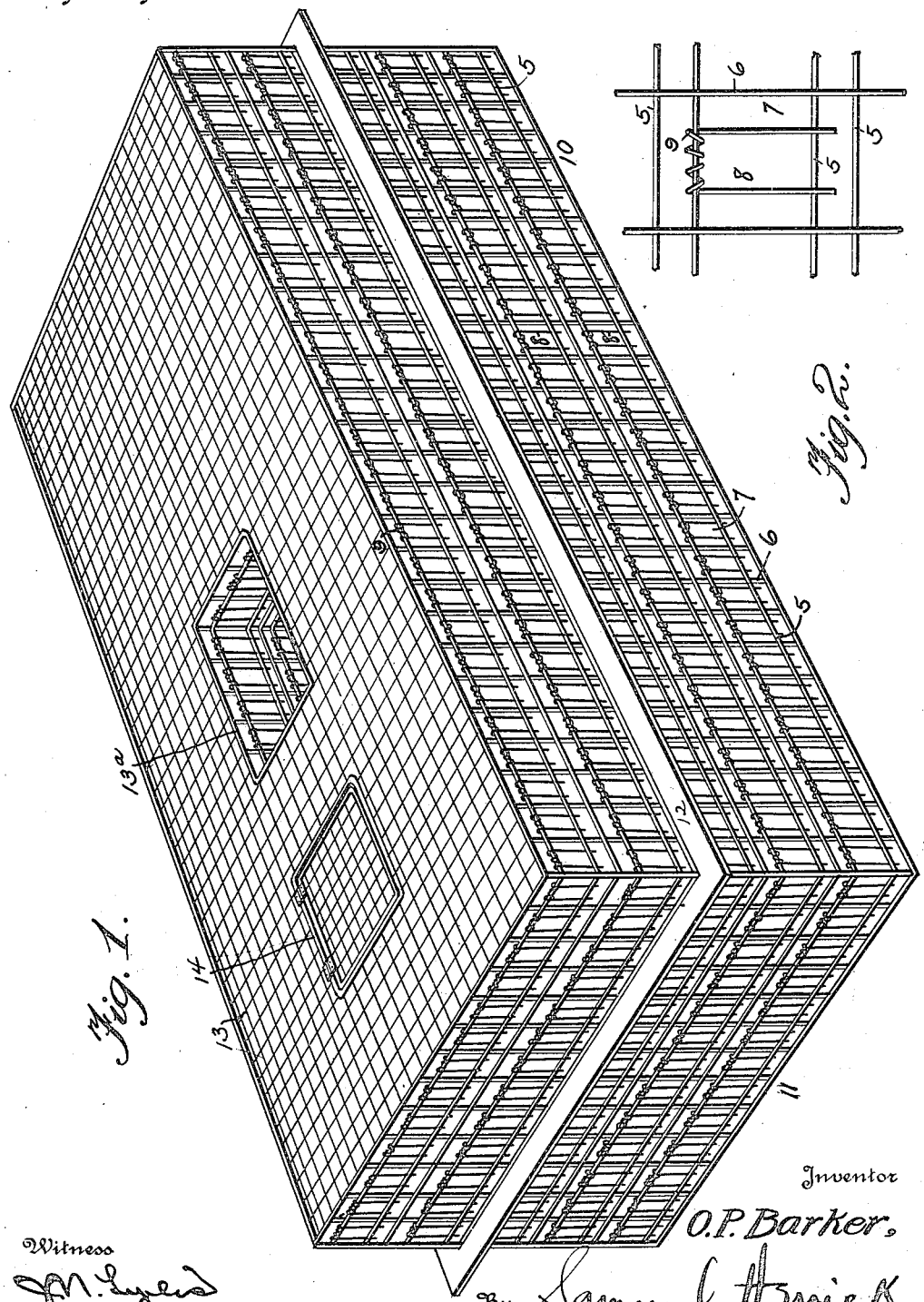

ORVIL P. BARKER, OF WICHITA, KANSAS.

BIRD-TRAP.

1,262,160.	Specification of Letters Patent.	Patented Apr. 9, 1918.

Application filed September 20, 1917. Serial No. 192,272.

*To all whom it may concern:*

Be it known that I, ORVIL P. BARKER, a citizen of the United States, residing at Wichita, in the county of Sedgwick and State of Kansas, have invented certain new and useful Improvements in Bird-Traps, of which the following is a specification.

This invention relates to traps and more particularly to sparrow traps and it has for its object the provision of a device of this character constructed in such manner that it may be very economically manufactured and will be so arranged as to largely overcome the timidity of the birds and cause them to enter readily therein.

In the accompanying drawing, Figure 1 is a perspective view of a sparrow trap constructed in accordance with the invention and Fig. 2 is a fragmentary view thereof.

Referring to the drawing it will be seen that my improved netting comprises horizontal strand wires 5 and vertical strand wires 6 and these wires are so arranged as to provide frequent openings 7, said openings being adapted to be closed by doors or gates 8 which comprise U shaped members, the bight portions 9 of which are bent into hinged engagement with the strand wires at the top of the opening and the legs of which overlap the strand wires 5 at the bottom of the opening, to thereby permit opening of the gates in one direction only.

It is to be understood that I contemplate the manufacture of this netting in any desired width and length, and that it is to be sold as an article of manufacture in the same manner that poultry netting is now sold.

In Fig. 1 I have illustrated a form of trap which may be advantageously employed and which may be readily constructed from netting such as that illustrated in Fig. 2. In this case it will be seen that the side walls 10 and the end walls 11 of the trap are made of netting like that illustrated in Fig. 2, and that the trap is provided with landing ledges 12 which encourage the birds to alight and to aid them in finding readily entrance to the interior of the trap. The trap is covered by screen wire of an ordinary kind, indicated at 13, and this screen wire has a central opening 13$^a$ therein which gives entrance to the interior of a small rectangular compartment formed of netting of the type shown in Fig. 2, and comprises bottom strand wires 15, side walls 16 and end walls 17, so that sparrows flying down from above will find ready entrance to the trap through the top thereof. If desired a door indicated at 14 may be provided in the top of the trap.

However it is to be understood that the particular construction of the trap is immaterial, the invention residing particularly in the netting illustrated in Fig. 2.

When the sparrows fly into the open top of the trap they find themselves inclosed by the side walls and in their desire to escape from the position in which they are more or less hemmed in they pass more readily through the openings 9 than would be the case if said openings were formed in an outside wall of the cage, because in the latter case the sparrow would be passing from the unrestricted "open" into a cage, while with the trap arranged as shown and described the sparrow passes from a constricted to an enlarged space. It is to be noted that the legs of the gates lie outside the strand wires at the top and inside the strand wires at the bottom, so that the gates tend to swing closed and the birds find escape impossible after they have once entered the trap.

While the trap herein shown and described is particularly adapted for catching sparrows it is apparent that it is not limited in its use but may be employed to trap birds whenever it becomes desirable to do so.

Having described my invention what I claim is:

1. A netting of the character described comprising a plurality of vertical and horizontal rows of openings closed by gates opening in one direction only.

2. As an article of manufacture a netting comprising a plurality of strand wires running horizontally and a plurality of strand wires running vertically, said wires being so spaced as to provide a plurality of vertical rows and a plurality of horizontal rows of openings, and gates consisting of U shaped members the bight portions of which are bent into engagement with the horizontal strand wires above said opening, said gates serving to permit the passage of creatures to said openings in one direction only.

3. As an article of manufacture a netting for traps the entire area of which is composed of vertical and horizontal strand wires which are so spaced as to provide a plurality of rows of horizontal and vertical openings and gates for closing said openings formed of single pieces of wire bent to U shape with their bight portions twisted into engagement with those strand wires above the openings and their legs disposed inwardly of the strand wires below said openings.

In testimony whereof I affix my signature in the presence of two witnesses.

ORVIL P. BARKER.

Witnesses:
H. D. BAKER,
J. H. GIDLEY.

Copies of this patent may be obtained for five cents each, by addressing the "Commissioner of Patents, Washington, D. C."